(12) United States Patent
Kiselis et al.

(10) Patent No.: US 7,506,894 B2
(45) Date of Patent: Mar. 24, 2009

(54) INTEGRAL CROSS MEMBER WITH STEERING GEAR JOINT

(75) Inventors: Gregory Kiselis, Livonia, MI (US); Dalip K. Matharoo, Orin, MI (US); Gianfranco Gabbianelli, Troy, MI (US); Seetarama S. Kotagiri, Rochester Hills, MI (US)

(73) Assignee: Magna International, Inc., Aurora, Ontario (CA)

( * ) Notice: Subject to any disclaimer, the term of this patent is extended or adjusted under 35 U.S.C. 154(b) by 403 days.

(21) Appl. No.: 11/294,716

(22) Filed: Dec. 6, 2005

(65) Prior Publication Data

US 2006/0131932 A1 Jun. 22, 2006

Related U.S. Application Data

(60) Provisional application No. 60/632,938, filed on Dec. 6, 2004.

(51) Int. Cl.
 *B62D 21/00* (2006.01)
(52) U.S. Cl. .................. 280/795; 280/796; 280/797; 296/204
(58) Field of Classification Search ............ 280/781, 280/795, 796, 797, 798, 799, 800; 296/204
 See application file for complete search history.

(56) References Cited

U.S. PATENT DOCUMENTS

| 1,368,427 | A | | 2/1921 | Geistert | |
|---|---|---|---|---|---|
| 3,694,890 | A | | 10/1972 | Arning et al. | |
| 3,856,323 | A | | 12/1974 | Arning et al. | |
| 4,314,710 | A | | 2/1982 | Kamoshita et al. | |
| 4,623,167 | A | * | 11/1986 | Matsubayashi et al. | 280/798 |
| 4,768,808 | A | * | 9/1988 | DeRees | 280/796 |
| 4,828,063 | A | | 5/1989 | Ogura et al. | |
| 4,903,791 | A | * | 2/1990 | Cameron et al. | 180/252 |
| 5,542,707 | A | * | 8/1996 | Kamei et al. | 280/834 |
| 5,641,181 | A | * | 6/1997 | Galhotra | 280/795 |
| 5,879,026 | A | * | 3/1999 | Dostert et al. | 280/781 |
| 5,887,896 | A | | 3/1999 | Kobayashi et al. | |
| 5,899,498 | A | * | 5/1999 | Horton | 280/781 |
| 6,003,897 | A | * | 12/1999 | Dostert et al. | 280/781 |
| 6,003,900 | A | * | 12/1999 | Hasegawa et al. | 280/834 |
| 6,102,416 | A | | 8/2000 | Harkrader et al. | |
| 6,149,197 | A | | 11/2000 | Ishii et al. | |
| 6,397,701 | B1 | | 6/2002 | Park | |
| 6,398,260 | B1 | * | 6/2002 | Rinehart | 280/781 |
| 6,439,608 | B1 | | 8/2002 | Bonnville | |
| 6,672,603 | B2 | * | 1/2004 | Lee | 280/124.109 |

(Continued)

FOREIGN PATENT DOCUMENTS

JP 60226371 11/1985

(Continued)

*Primary Examiner*—Toan C To
(74) *Attorney, Agent, or Firm*—Harness, Dickey & Pierce, P.L.C.

(57) ABSTRACT

A motor vehicle frame includes a pair of longitudinal frame members. A cross member is provided to maintain the frame members in a spaced apart condition. The cross member has a first end configured to mount to a first one of the longitudinal frame members and a second end configured to engage a steering gear housing. The second end sandwiches steering gear housing as the second end is fastened to a second one of the frame members.

18 Claims, 5 Drawing Sheets

U.S. PATENT DOCUMENTS

| | | |
|---|---|---|
| 7,261,322 B2 * | 8/2007 | Ito et al. ............. 280/781 |
| 2004/0160028 A1 | 8/2004 | Tessier et al. |
| 2004/0201194 A1 | 10/2004 | Zhang et al. |
| 2006/0066090 A1 * | 3/2006 | Jennings et al. ............. 280/781 |

FOREIGN PATENT DOCUMENTS

| | | |
|---|---|---|
| JP | 06122379 | 5/1994 |

* cited by examiner

INTEGRAL CROSS MEMBER WITH STEERING GEAR JOINT

CROSS-REFERENCE TO RELATED APPLICATIONS

This application claims the benefit of U.S. Provisional Application No. 60/632,938 filed on Dec. 6, 2004. The disclosure of the above application is incorporated herein by reference.

FIELD OF THE INVENTION

The present invention relates to a structural assembly for a vehicle. In particular, this invention relates to a cross member with an integral steering gear joint.

BACKGROUND OF THE INVENTION

In body over frame type vehicles, the frame comprises longitudinal members that are interconnected with a series of cross members. The cross members are welded to the longitudinal members for structural rigidity. Vehicle components are then mounted on the frame.

In certain vehicles as illustrated in FIG. 1, the longitudinal members 12, 14 are interconnected with a forward cross member 100. The steering gear mount portion 16 (schematically illustrated) is mounted on the forward cross member 100, immediately adjacent the left hand side longitudinal member 14. However the position of the steering gear 16 interferes with the mounting arrangement of the cross member 100 and sleeve 102 to the longitudinal member 14. As a result, the cross member 100 cannot be fully welded to the longitudinal member 14. The recirculating ball steering gear is mounted with single shear joints, which joints cause noise, vibration, and harshness problems. Further, dimensional tolerances cannot be met leading to durability issues.

SUMMARY OF THE INVENTION

The disadvantages of the prior art may be overcome by providing a structural cross member for a vehicle frame that simultaneously mounts a steering gear assembly and mounts the cross member to the longitudinal member.

According to one aspect of the invention, there is provided a motor vehicle frame that includes a pair of longitudinal frame members with cross members provided to maintain the frame members in a spaced apart condition. At least one of the cross members has a first end configured to mount to a first one of the longitudinal frame members and a second end configured to engage a steering gear housing. The second end sandwiches steering gear housing as the second end is fastened to a second one of the frame members.

Other aspects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings.

DESCRIPTION OF ILLUSTRATED EMBODIMENTS

Figure 1:
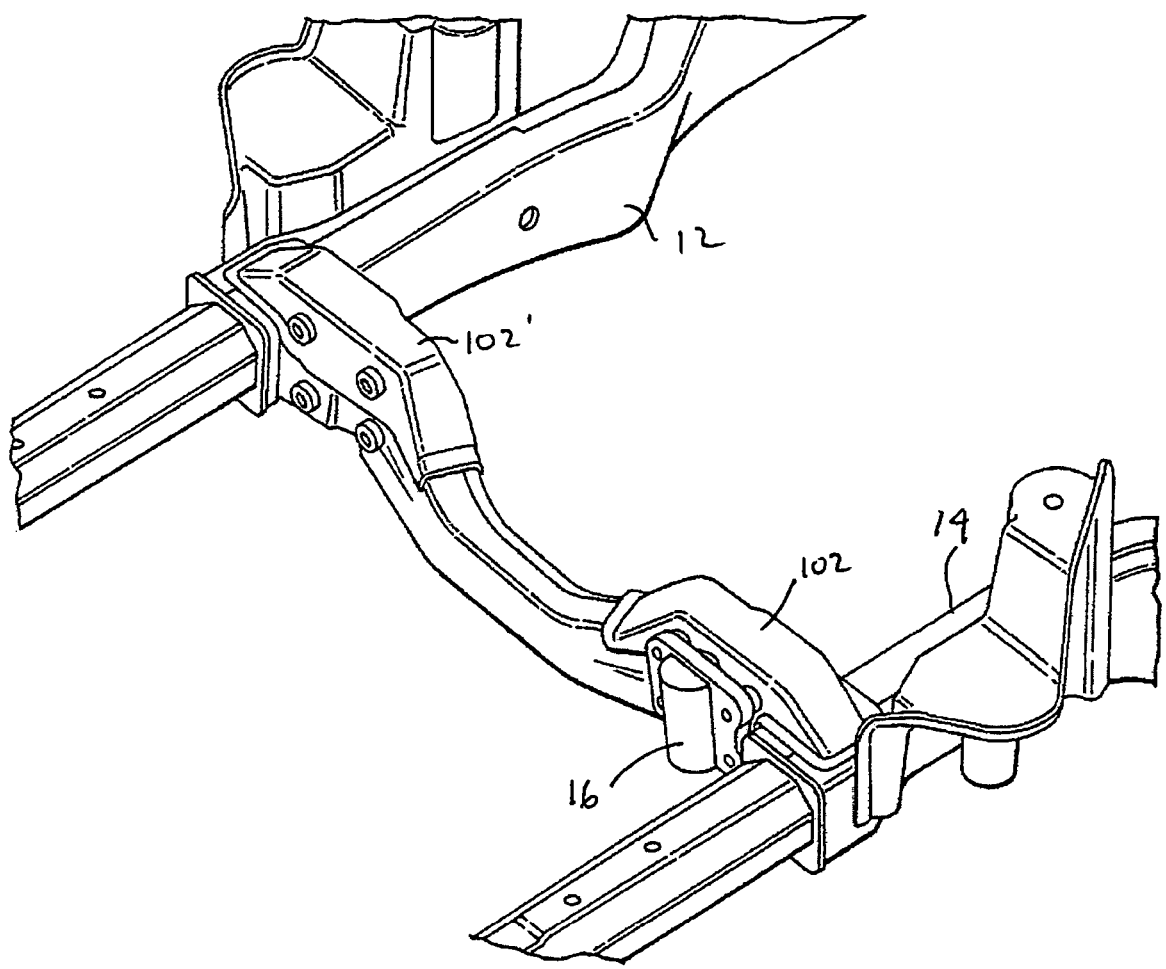
FIG. 1 is a partial perspective view of a frame of the prior art.
Figure 2:
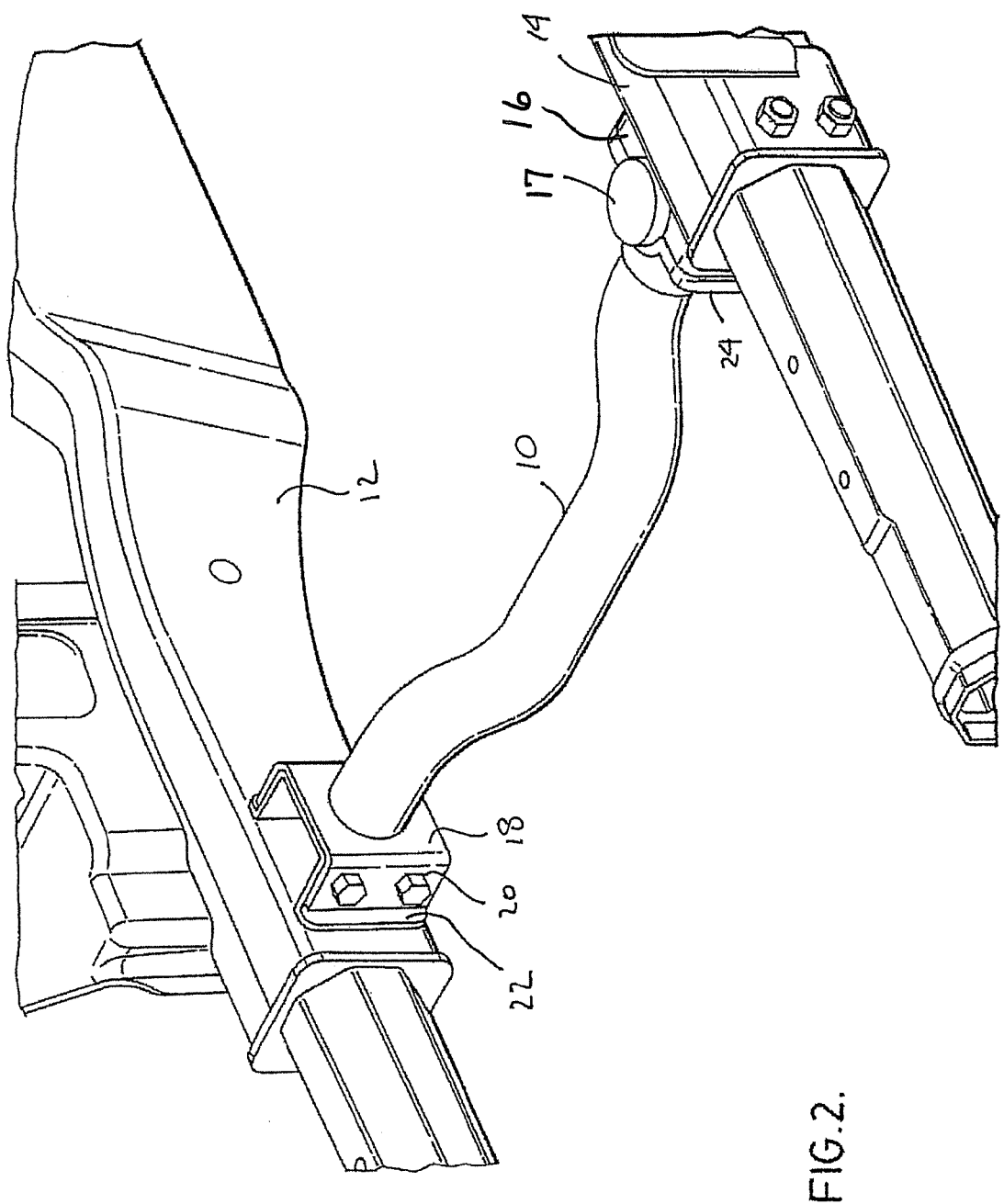
FIG. 2 is a partial perspective view of the frame with cross member of the present invention.

Referring to FIG. 2, a frame incorporating the cross member assembly of the present invention is generally illustrated. The vehicle frame generally comprises a pair of spaced apart longitudinal members 12, 14 joined together by a cross member 10. Other cross members, as are common in the art, are also utilized but not illustrated to provide a rigid frame structure.

In the preferred embodiment, cross member 10 is tubular having an inverted saddle shape and made from steel tube, preferably 1008/1010 or any 35 ksi steel or a grade of high strength steel. The cross member 10 has clevis bracket 18 affixed to a first end thereof. Clevis bracket 18 is a U shaped bracket with the bight portion attached to the cross member 10, preferably by welding. The bight portion has an aperture that complementarily receives the cross member 10. The side walls of the clevis bracket 18 each has a series of oversized or elongated slots or apertures 20. The clevis bracket 18 overlies a U shaped frame bracket 22 that is welded onto the inside face of longitudinal bracket 12. The frame bracket 22 nests within the clevis bracket 18. The side walls of the frame bracket 22 each has a series of apertures that correspond with the apertures 20 of clevis bracket 18. Fasteners, such as rivets or nuts and bolts, securely join the frame bracket 22 to the clevis bracket 18. The oversized apertures 20 accommodate cross car variations for fit up.

Figure 3:
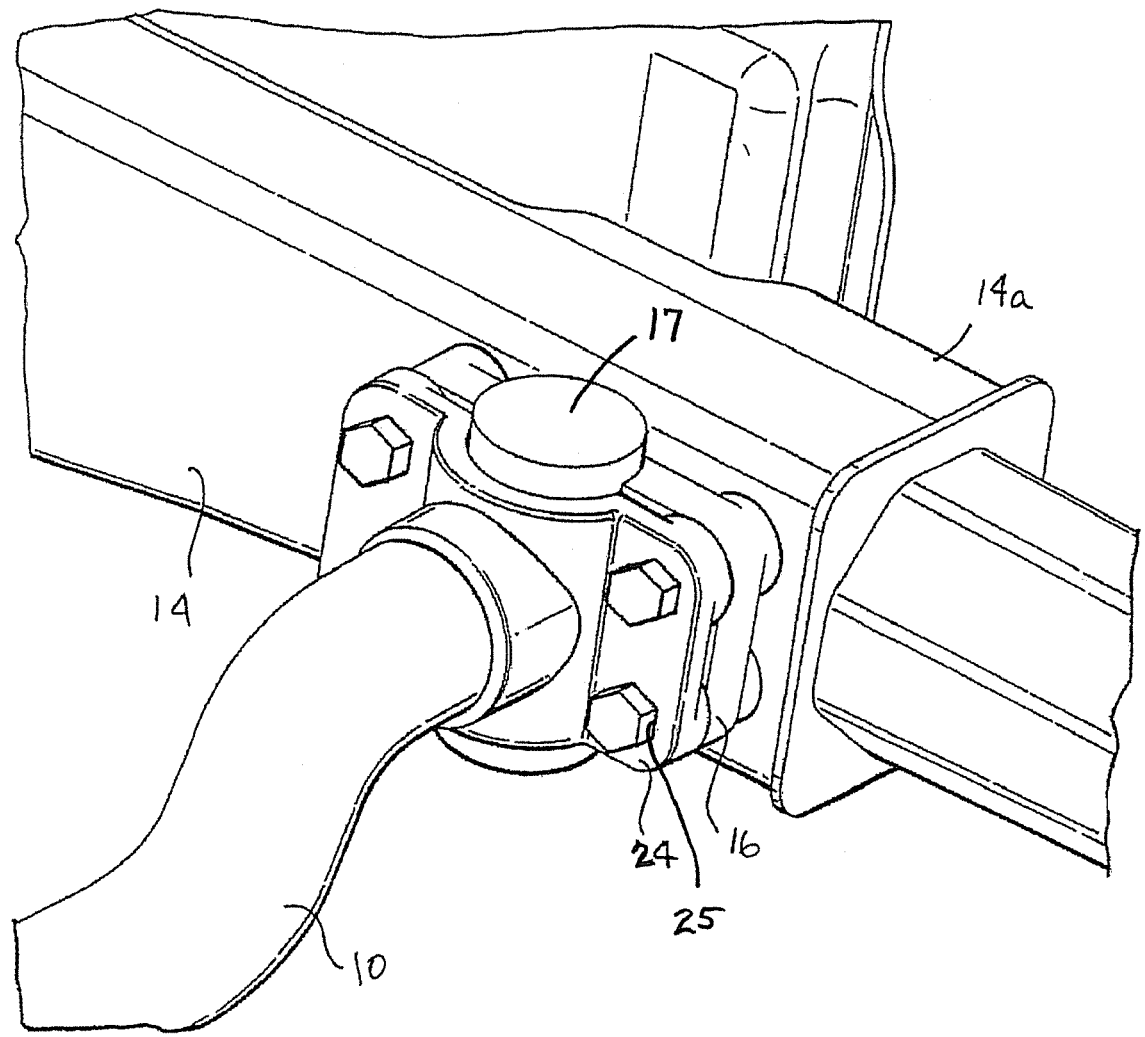
FIG. 3 is partial perspective view of the steering gear mount of the embodiment of FIG. 2
Figure 4:
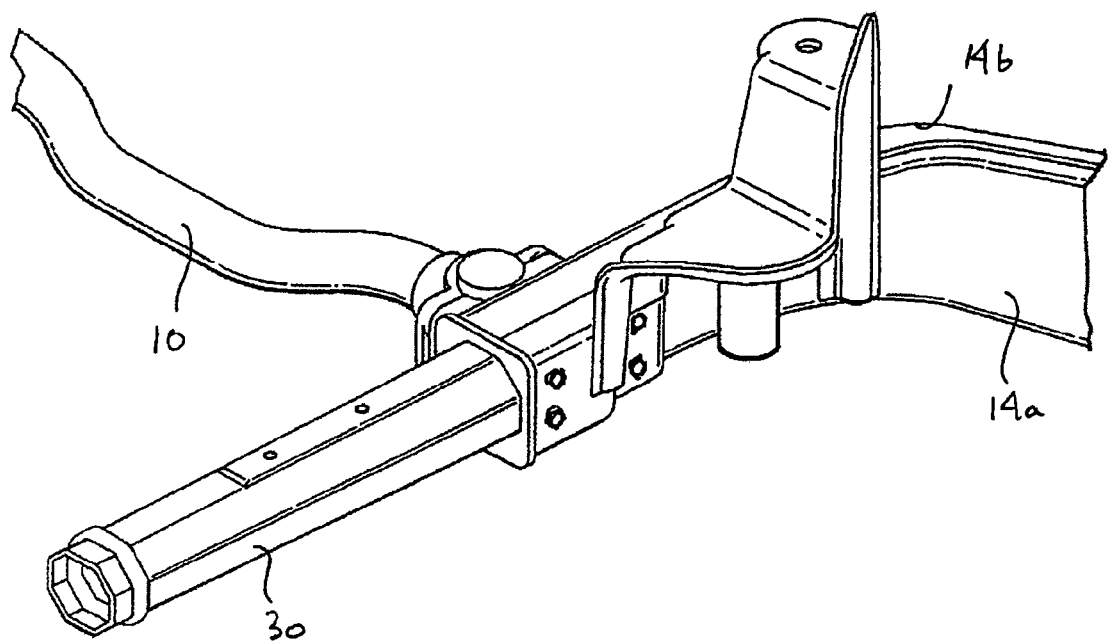
FIG. 4 is a partial perspective view of the steering gear mount, from a reverse angle from FIG. 3.

Referring to FIG. 3, the opposite end of cross member 10 has a gear bracket 24. The gear bracket 24 is preferably nodular cast iron. The gear bracket 24 is attached to the end of cross member 10. Suitable joining methods include welding and cast in place as described in co-pending application no. 60/682,329, filed Apr. 19, 2005, the contents of which are incorporated herein by reference. The outer surface of the gear bracket 24 has a complementary fit with a housing 16 of a steering gear assembly 17, schematically illustrated in the figures. Gear bracket 24 has a pair of flanges having apertures 25 therein. Apertures 25 are aligned with the apertures of the gear assembly housing, enabling an elongate fastener, such as a bolt or rivet to extend therethrough.

To form a more stable and rigid connection, housing 16 is sandwiched between longitudinal frame member 14 and cross-member 10. The housing 16 nests on one side of the frame member 14 and is bolted onto the frame, providing a double shear joint for the mounting of the recirculating ball steering gear assembly 17. The steering gear housing thus becomes a structural member, while occupying less package space over the prior art.

Figure 5:
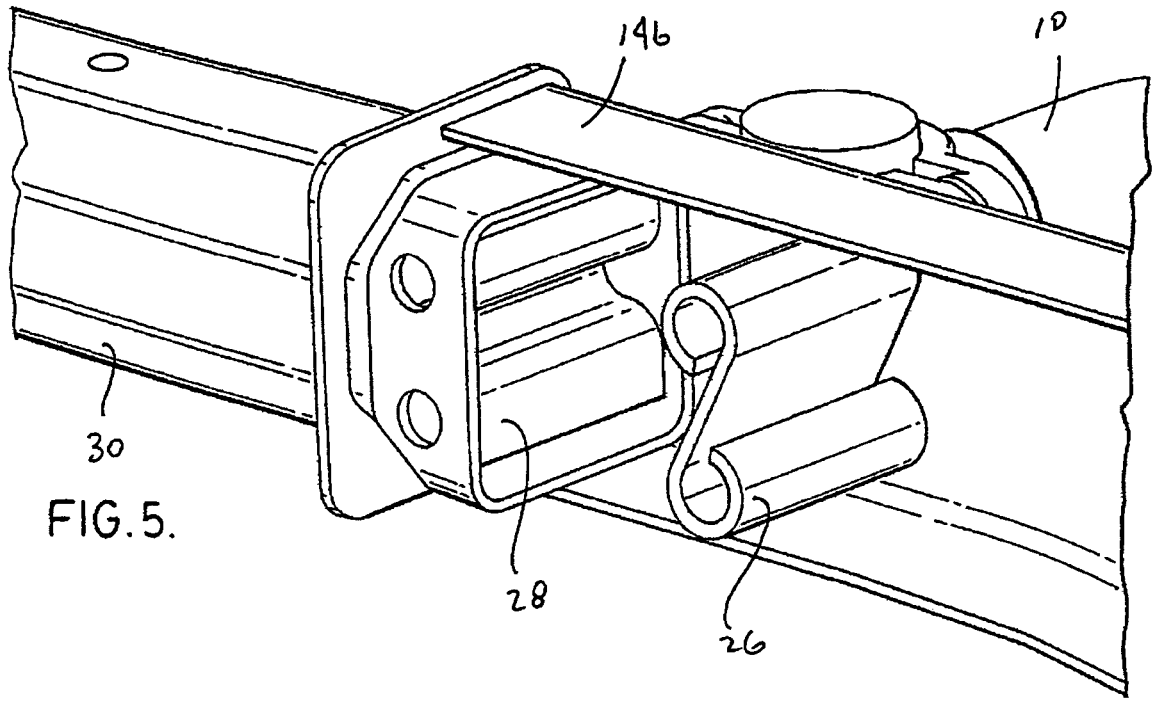
FIG. 5 is a partial perspective view of the steering gear mount of FIG. 4.
Figure 6:
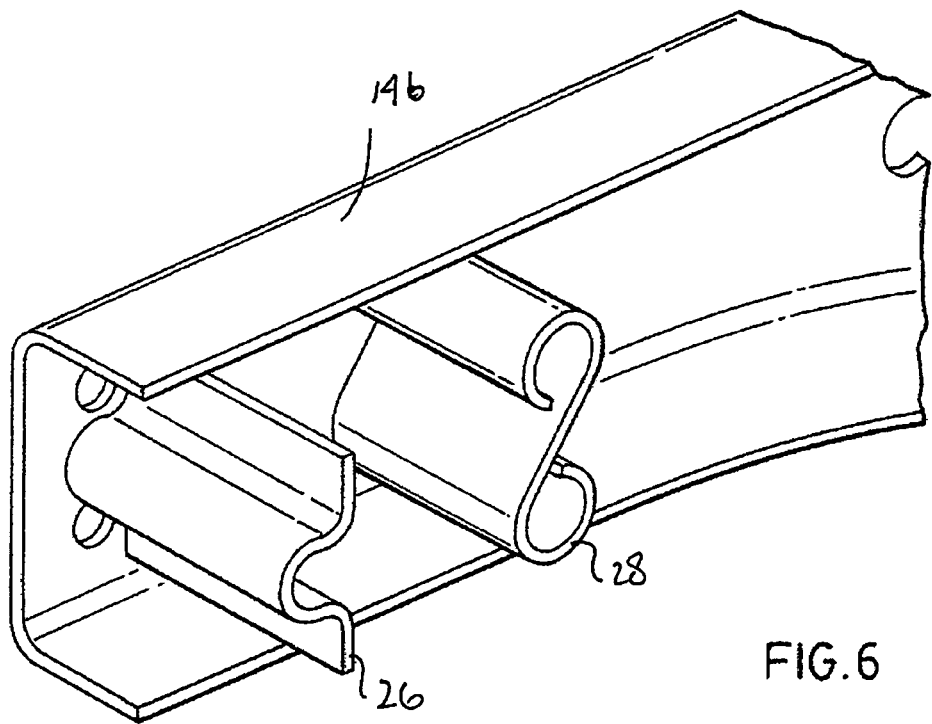
FIG. 6 is partial perspective view of the spacers for mounting the cross member of the present invention.

Referring to FIGS. 5 and 6, a reverse view of the frame member 14 is illustrated. The frame member 14 comprises to half sections 14a and 14b that are arranged in a face to face configuration to present a closed box section. To support the longitudinal frame member 14, a pair of spacers 26, 28 is provided to support the frame member 14 and prevent the frame member 14 from collapsing. Spacer 26 is configured to be inserted into the end of octagonal crush tip 30, which is frictionally fitted within the end of frame member 14. Thus, spacer 26 supports both the crush tip 30 and the frame member 14. Preferably, spacer 26 is omega shaped. Spacer 28 is configured to be frictionally fitted within the frame member 14. In the preferred embodiment, the spacer 28 is S shaped.

The foregoing specific embodiments have been provided to illustrate the structural and functional principles of the present invention, and are not intended to be limiting. To the contrary, the present invention is intended to encompass all modifications, alterations, and substitutions within the spirit and scope of the appended claims.

What is claimed is:

1. A cross member for a motor vehicle frame having a pair of longitudinal frame members, said cross member comprising a first end configured to mount to a first one of said pair of longitudinal frame members and a second end configured to engage a steering gear housing, wherein said second end sandwiches said steering gear housing as said second end is fastened to a second one of said pair of longitudinal frame members, wherein said second end has a gear bracket attached thereto, said gear bracket having a configuration to complementarily fit with said steering gear housing.

2. A cross member according to claim 1, wherein said first end has a clevis bracket to nest onto a frame bracket mounted on said first one of said pair of longitudinal frame members.

3. A cross member according to claim 2, wherein said clevis bracket is affixed to the first end of the cross member.

4. A cross member according to claim 3, wherein said clevis bracket is provided with elongated apertures for receiving fasteners to join said clevis bracket to said frame bracket.

5. A cross member according to claim 1, wherein said gear bracket is cast on the second end.

6. A cross member according to claim 1, wherein said gear bracket is cast and affixed onto the second end.

7. A vehicle frame comprising a pair of longitudinal frame members and cross members interconnecting said frame members, wherein at least one cross member has a first end configured to mount to a first one of said pair of longitudinal frame members and a second end configured to engage a steering gear housing, wherein said second end sandwiches said steering gear housing as said second end is fastened to a second one of said pair of longitudinal frame members, wherein said second end of said cross member has a gear bracket attached thereto, said gear bracket having a configuration to complementarily fit with said steering gear housing.

8. A vehicle frame according to claim 7, wherein said first end of said cross member has a clevis bracket to nest onto a frame bracket mounted on said first one of said pair of longitudinal frame members.

9. A vehicle frame according to claim 8, wherein said clevis bracket is affixed to the first end of the cross member.

10. A vehicle frame according to claim 9, wherein said clevis bracket is provided with elongated apertures for receiving fasteners to join said clevis bracket to said frame bracket.

11. A vehicle frame according to claim 7, wherein said gear bracket is cast on the second end.

12. A vehicle frame according to claim 7, wherein said gear bracket is cast and affixed onto the second end.

13. A vehicle frame comprising a pair of longitudinal frame members and cross members interconnecting said frame members, said cross members including a first end coupled to a first one of said pair of longitudinal frame members and a second end engaging a steering gear housing, wherein said steering gear housing is sandwiched between said second end of said cross members and a second one of said pair of longitudinal frame members.

14. A vehicle frame according to claim 13, wherein said second end of said cross member has a gear bracket attached thereto, said gear bracket having a configuration to complementarily fit with said steering gear housing.

15. A vehicle frame according to claim 14, wherein said first end of said cross member has a clevis bracket to nest onto a frame bracket mounted on said first one of said pair of longitudinal frame members.

16. A vehicle frame according to claim 13, wherein said steering gear housing includes a first surface engaging said second one of said pair of longitudinal frame members.

17. A vehicle frame according to claim 16, wherein said steering gear housing includes a second surface opposite said first surface, said second surface engaging a flange formed at said second end of said cross member.

18. A vehicle frame according to claim 13, wherein said cross member includes a tubular shape.

* * * * *